US006340725B1

(12) United States Patent
Wang et al.

(10) Patent No.: US 6,340,725 B1
(45) **Date of Patent: *Jan. 22, 2002**

(54) INKJET PRINTING MEDIA

(75) Inventors: Alan E. Wang, Hoffman Estates, IL (US); Louis J. Nehmsmann, Apollo, PA (US); Suk H. Cho, Monroeville, PA (US); Robert H. Tang; William C. Allison, both of Murrysville, PA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,154

(22) Filed: Oct. 11, 1999

Related U.S. Application Data

(62) Division of application No. 08/876,070, filed on Jun. 13, 1997.

(51) Int. Cl.[7] ......................... C08L 33/26; C08L 33/08; C08L 33/10; C08L 29/04; C08K 5/19

(52) U.S. Cl. ....................... 524/503; 524/513; 524/521; 525/217; 525/228

(58) Field of Search ................................ 524/503, 513, 524/521; 525/187, 217, 228; 428/511, 342, 325

(56) References Cited

U.S. PATENT DOCUMENTS

| | | | | |
|---|---|---|---|---|
| 3,011,918 | A | 12/1961 | Silvernail et al. | 117/201 |
| 3,544,318 | A | 12/1970 | Boothe et al. | 96/1.5 |
| 3,813,264 | A | 5/1974 | Boothe et al. | 117/201 |
| 4,148,639 | A | 4/1979 | Sinkovitz et al. | 96/1.5 R |
| 4,171,417 | A | 10/1979 | Dixon | 526/245 |
| 4,316,943 | A | 2/1982 | Sinkovitz et al. | 428/475.8 |
| 4,371,582 | A | 2/1983 | Sugiyama et al. | 428/341 |
| 4,446,174 | A | 5/1984 | Mackawa et al. | 427/261 |
| 4,469,555 | A | 9/1984 | Masalanka et al. | 162/162 |
| 4,547,405 | A | 10/1985 | Bedell et al. | 427/256 |
| 4,554,181 | A | 11/1985 | Cousin et al. | 427/261 |
| 4,576,867 | A | 3/1986 | Miyamoto | 428/342 |
| 4,613,525 | A | 9/1986 | Miyamoto et al. | 427/256 |
| 4,680,235 | A | 7/1987 | Murakami et al. | 428/414.4 |
| 4,699,951 | A | 10/1987 | Allenson et al. | 525/194 |
| 4,725,849 | A | 2/1988 | Koike et al. | 346/1.1 |
| 4,740,420 | A | 4/1988 | Akutsu et al. | 428/341 |
| 4,770,934 | A | 9/1988 | Yamasaki et al. | 428/331 |
| 4,801,497 | A | 1/1989 | Kono et al. | 428/332 |
| 4,830,911 | A | 5/1989 | Kojima et al. | 428/342 |
| 4,877,680 | A | 10/1989 | Sakaki et al. | 428/332 |
| 4,879,166 | A | 11/1989 | Misuda et al. | 428/212 |
| 4,900,620 | A | 2/1990 | Tokita et al. | 428/330 |
| 4,910,084 | A | 3/1990 | Yamasaki et al. | 428/411.1 |
| 4,944,988 | A | 7/1990 | Yasuda et al. | 428/195 |
| 4,946,741 | A | 8/1990 | Aono et al. | 428/336 |
| 4,954,372 | A | 9/1990 | Sako et al. | 427/388.2 |
| 5,101,218 | A | 3/1992 | Sakaki et al. | 346/1.1 |
| 5,104,730 | A | 4/1992 | Misuda et al. | 428/304.4 |

(List continued on next page.)

FOREIGN PATENT DOCUMENTS

| | | |
|---|---|---|
| EP | 0 212 655 | 3/1987 |
| EP | 0 553 761 | 8/1993 |
| EP | 0 627 324 | 12/1994 |
| EP | 0 709 520 | 5/1996 |
| EP | 0 767 071 | 4/1997 |
| EP | 0 806 299 | 11/1997 |
| EP | 0 818 322 | 1/1998 |
| EP | 0 819 546 | 1/1998 |
| JP | 7-70950 | 3/1995 |
| WO | WO 96/18496 | 6/1996 |

OTHER PUBLICATIONS

Derwent Abstract for JP 6297831 (1994).

HYDRAD™ HBC Technical Sheet, J. M. Huber Corp., 1998.

HYDRAD™ HBF Technical Sheet, J. M. Huber Corp., 1998.

A. and E. Rose, *The Condensed Chemical Dictionary*, Sixth Edition, Reinhold Publishing Corp. NY, 1961, pp. 47 and 583.

H. P. Rooksby, Chapter X, “Oxides and Hydroxides of Aluminum and Iron”, *The X–Ray Identification and Crystal Structure of Clay Minerals*, Mineralogical Society (Clay Minerals Group), London, 1961, pp. 354–363 and 390–392.

G. W. Brindley and G. Brown, Chapter 2, “Order–Disorder in Clay Mineral Structures”, and Chapter 6, “Associated Minerals”, *Crystal Structures of Clay Minerals and Their X–Ray Identification*, Mineralogical Society Monograph No. 5, London, 1980, pp. 125–132, 189–195, 361–365 and 407–410.

Derwent Abstract for JP 7070950 (1995).

Derwent Abstract for EP 806299 (1997).

Patent Abstracts of Japan, Publication No. 05124330, Publication Date May 21, 1993.

*Primary Examiner*—Vasu Jagannathan
*Assistant Examiner*—Callie E Shosho

(57) ABSTRACT

A printing medium comprising a substrate having at least one surface and a coating on the surface wherein the coating comprises: (a) binder comprising: (1) organic polymer which is substantially free of ammonium groups, (2) first cationic addition polymer consisting essentially of quaternary ammonium-containing mer units derived from addition monomer and ammonium-free mer units derived from addition monomer, and (3) second cationic addition polymer consisting essentially of secondary, tertiary, or both secondary and tertiary ammonium-containing mer units derived from addition monomer and ammonium-free mer units derived from addition monomer, wherein the binder constitutes from 20 to 90 percent by weight of the coating; and (b) finely divided substantially water-insoluble filler particles which have a maximum dimension of less than 500 nanometers, are distributed throughout the binder, and constitute from 10 to 80 percent by weight of coating.

15 Claims, No Drawings

U.S. PATENT DOCUMENTS

| | | | | |
|---|---|---|---|---|
| 5,165,973 | A | 11/1992 | Kojima et al. | 428/331 |
| 5,180,624 | A | 1/1993 | Kojima et al. | 428/211 |
| 5,206,071 | A | 4/1993 | Atherton et al. | 428/195 |
| 5,212,008 | A | 5/1993 | Malhotra et al. | 428/216 |
| 5,213,873 | A | 5/1993 | Yasuda et al. | 428/195 |
| 5,223,338 | A | 6/1993 | Malhotra | 428/342 |
| 5,246,774 | A | 9/1993 | Sakaki et al. | 428/323 |
| 5,264,275 | A | 11/1993 | Misuda et al. | 428/304.4 |
| 5,270,103 | A | 12/1993 | Oliver et al. | 428/219 |
| 5,271,989 | A | 12/1993 | Mori et al. | 428/195 |
| 5,275,867 | A | 1/1994 | Misuda et al. | 428/195 |
| 5,277,965 | A | 1/1994 | Malhotra | 428/216 |
| 5,279,885 | A | 1/1994 | Ohmori et al. | 428/195 |
| 5,302,249 | A | 4/1994 | Malhotra et al. | 162/135 |
| 5,302,437 | A | 4/1994 | Idei et al. | 428/195 |
| 5,302,439 | A | 4/1994 | Malhotra et al. | 428/195 |
| 5,314,747 | A | 5/1994 | Malhotra et al. | 428/341 |
| 5,320,897 | A | 6/1994 | Kondo et al. | 428/195 |
| 5,320,902 | A | 6/1994 | Malhotra et al. | 428/342 |
| 5,338,597 | A | 8/1994 | Kurabayashi | 428/195 |
| 5,342,688 | A | 8/1994 | Kitchin et al. | 428/402 |
| 5,354,634 | A | 10/1994 | Misuda et al. | 430/18 |
| 5,362,558 | A | 11/1994 | Sakaki et al. | 428/323 |
| 5,380,782 | A | 1/1995 | Bogan, Jr. | 524/404 |
| 5,389,723 | A | 2/1995 | Iqbal et al. | 525/57 |
| 5,407,600 | A | 4/1995 | Ando et al. | 252/313.1 |
| 5,418,078 | A | 5/1995 | Desie et al. | 428/704 |
| 5,439,739 | A | 8/1995 | Furukawa et al. | 428/341 |
| 5,441,795 | A | 8/1995 | Malhotra et al. | 428/195 |
| 5,445,868 | A | 8/1995 | Harasawa et al. | 428/206 |
| 5,457,486 | A | 10/1995 | Malhotra et al. | 347/105 |
| 5,463,178 | A | 10/1995 | Suzuki et al. | 428/216 |
| 5,472,757 | A | 12/1995 | Ogawa et al. | 428/40 |
| 5,472,773 | A | 12/1995 | Misuda et al. | 428/195 |
| 5,472,789 | A | 12/1995 | Iqbal et al. | 428/483 |
| 5,474,843 | A | 12/1995 | Lambert et al. | 428/327 |
| 5,478,631 | A | 12/1995 | Kawano et al. | 428/212 |
| 5,494,733 | A | 2/1996 | Koike et al. | 428/224 |
| 5,494,759 | A | 2/1996 | Williams et al. | 428/514 |
| 5,496,634 | A | 3/1996 | Ogawa et al. | 428/341 |
| 5,500,668 | A | 3/1996 | Malhotra et al. | 347/105 |
| 5,518,821 | A | 5/1996 | Sakaki et al. | 428/500 |
| 5,523,149 | A | 6/1996 | Kijimuta et al. | 428/307.3 |
| 5,547,607 | A | 8/1996 | Ando et al. | 252/313.1 |
| 5,560,982 | A | 10/1996 | Sato | 428/216 |
| 5,567,507 | A | 10/1996 | Paff et al. | 428/213 |
| 5,569,529 | A | 10/1996 | Becker et al. | 428/331 |
| 5,576,088 | A | 11/1996 | Ogawa et al. | 428/327 |
| 5,605,750 | A | 2/1997 | Romano et al. | 428/304.4 |
| 5,609,964 | A | 3/1997 | Ogawa et al. | 428/520 |
| 5,612,281 | A | 3/1997 | Kobayashi et al. | 503/227 |
| 5,616,409 | A | 4/1997 | Matsuda et al. | 428/323 |
| 5,624,482 | A | 4/1997 | Kijimuta et al. | 100/31.37 |
| 5,645,631 | A | 7/1997 | Koike et al. | 106/31.36 |
| 5,672,392 | A | 9/1997 | De Clercq et al. | 427/391 |
| 5,683,784 | A | 11/1997 | Nakao et al. | 428/195 |
| 5,691,046 | A | 11/1997 | Matsubara et al. | 428/310.5 |
| 5,693,410 | A | 12/1997 | Malhotra et al. | 428/216 |
| 5,880,196 | A | 3/1999 | Cho et al. | 524/437 |
| 5,908,728 | A | 6/1999 | Sakaki et al. | 430/126 |

INKJET PRINTING MEDIA

This application is a division of application Ser. No. 08/876,070 filed Jun. 13, 1997.

When substrates coated with an ink-receiving coating are printed with inkjet printing inks and dried, the inks often later migrate from their original locations on the coated substrate, thereby resulting in unsatisfactory images. Such migration is known as "bleed" or "bloom" and is especially prevalent under conditions of high temperature and high humidity such as for example, 35° C. an 80 percent relative humidity.

It has now been found that bleed can be substantially reduced or even eliminated if the coating contains organic polymer which is substantially free of ammonium groups, addition polymer containing quaternary ammonium groups, and addition polymer containing secondary, tertiary, or both secondary and tertiary ammonium groups.

Accordingly, one embodiment of the invention is a coating composition comprising: (a) a volatile aqueous liquid medium; and (b) binder dissolved or dispersed in the volatile aqueous liquid medium, the binder comprising: (1) water-soluble film-forming organic polymer which is substantially free of ammonium groups, (2) water-soluble first cationic addition polymer consisting essentially of quaternary ammonium-containing mer units and ammonium-free mer units, and (3) water-soluble second cationic addition polymer consisting essentially of secondary, tertiary, or both secondary and tertiary ammonium-containing mer units and ammonium-free mer units, wherein the binder constitutes from 20 to 90 percent by weight of the solids of the coating composition; and (c) finely divided substantially water-insoluble filler particles which have a maximum dimension of less than 500 nanometers and constitute from 10 to 80 percent by weight of the solids of the coating composition.

Another embodiment of the invention is a printing medium comprising a substrate having at least one surface and a coating on the surface wherein the coating comprises: (a) binder comprising: (1) organic polymer which is substantially free of ammonium groups, (2) first cationic addition polymer consisting essentially of quaternary ammonium-containing mer units and ammonium-free mer units, and (3) second cationic addition polymer consisting essentially of secondary, tertiary, or both secondary and tertiary ammonium-containing mer units and ammonium-free mer units, wherein the binder constitutes from 20 to 90 percent by weight of the solids of the coating; and (b) finely divided substantially water-insoluble filler particles which have a maximum dimension of less than 500 nanometers, are distributed throughout the binder, and constitute from 10 to 80 percent by weight of the solids of the coating.

Yet another embodiment of the invention is a printing process which comprises applying liquid ink droplets to the printing medium of the second embodiment.

The printing media of the invention may be made by coating a surface of a substrate with the coating composition of the invention and thereafter substantially removing the aqueous liquid medium.

The coating composition can be in the form of an aqueous solution in which case the volatile aqueous liquid medium is a volatile aqueous solvent for the polymer of the binder, or the coating composition can be in the form of an aqueous dispersion in which instance the volatile aqueous liquid medium is a volatile aqueous dispersion liquid for at least some of the polymer of the binder.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the coating compositions of the invention and which become components of the volatile aqueous liquid medium, may be present at low concentrations.

In most instances water constitutes at least 80 percent by weight of the volatile aqueous liquid medium. Often water constitutes at least 95 percent by weight of the volatile aqueous liquid medium. Preferably water constitutes substantially all of the volatile aqueous liquid medium.

The amount of volatile aqueous liquid medium present in the coating composition may vary widely. The minimum amount is that which will produce a coating composition having a viscosity low enough to apply as a coating. The maximum amount is not governed by any theory, but by practical considerations such as the cost of the liquid medium, the minimum desired thickness of the coating to be deposited, and the cost and time required to remove the volatile aqueous liquid medium from the applied wet coating. Usually, however, the volatile aqueous liquid medium constitutes from 75 to 98 percent by weight of the coating composition. In many cases the volatile aqueous liquid medium constitutes from 85 to 98 percent by weight of the coating composition. Often the volatile aqueous liquid medium constitutes from 86 to 96 percent by weight of the coating composition. Preferably the volatile aqueous liquid medium constitutes from 88 to 95 percent by weight of the composition.

The water-soluble film-forming organic polymer which is substantially free of ammonium groups and which may be used in the present invention are numerous and widely varied.

Examples include poly(ethylene oxide), poly(vinyl alcohol), poly(vinyl pyrrolidone), water-soluble cellulosic organic polymer, or a mixture of two or more thereof.

Water-soluble poly(ethylene oxide) is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1], diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5], trimethylolpropane [CAS 77-99-6], and α,ω-diaminopoly(propylene glycol) [CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and nondispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the poly(ethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly(ethylene oxide) polymer unsuitable for its purpose. In most cases the poly(ethylene oxide) is water-soluble. The preferred poly(ethylene oxide) is a water-soluble homopolymer of ethylene oxide produced using a small amount of ethylene glycol as an initiator.

The weight average molecular weight of the water-soluble poly(ethylene oxide) may vary widely. Usually it is in the range of from 100,000 to 3,000,000 although a weight average molecular weights somewhat below 100,000 or somewhat above 3,000,000 may be used. Often the weight average molecular weight of the water-soluble poly(ethylene oxide) is in the range of from 150,000 to 1,000,000. Frequently the weight average molecular weight of the water-soluble poly(ethylene oxide) is in the range of from 200,000 to 1,000,000. From 300,000 to 700,000 is preferred.

When used, poly(ethylene oxide) having a weight average molecular weight in the range of from 100,000 to 3,000,000 generally constitutes from 10 to 100 percent by weight of the water-soluble film-forming organic polymer which is substantially free of ammonium groups.

Water-soluble poly(vinyl alcohol) may be broadly classified as one of two types. The first type is fully hydrolyzed water-soluble poly(vinyl alcohol) in which less than 1.5 mole percent acetate groups are left on the molecule. The second type is partially hydrolyzed water-soluble poly(vinyl alcohol) in which from 1.5 to as much as 20 mole percent acetate groups are left on the molecule. The water-soluble organic polymer may comprise either type or a mixture of both. The weight average molecular weight of the water-soluble poly(vinyl alcohol) may vary considerably, but often it is in the range of from 100,000 to 400,000. In many cases the weight average molecular weight is in the range of from 110,000 to 300,000. From 120,000 to 200,000 is preferred.

Water-soluble poly(vinylpyrrolidone) is a known material and may be used. Usually, but not necessarily, the weight average molecular weight of the poly(vinylpyrrolidone) is in the range of from 10,000 to 3,000,000. From 50,000 to 1,000,000 is preferred.

There are many widely varying types of water-soluble cellulosic organic polymers which may be employed in the present invention. Of these, the water-soluble cellulose ethers are preferred water-soluble cellulosic organic polymers. Many of the water-soluble cellulose ethers are also excellent water retention agents. Examples of the water-soluble cellulose ethers include water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose [CAS 9004-64-2], water-soluble hydroxybutylcellulose [CAS 37208-08-5], water-soluble hydroxybutylmethylcellulose [CAS 9041-56-9] and water-soluble cellulose sulfate sodium salt [CAS 9005-22-5]. Water-soluble hydroxypropylcellulose is preferred.

Water-soluble hydroxypropylcellulose is a known material and is available commercially in several different weight average molecular weights. The weight average molecular weight of the water-soluble hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble hydroxypropylcelluloses having different weight average molecular weights may be admixed to obtain a water-soluble hydroxypropyl cellulose having a differing weight average molecular weight.

Water-soluble first cationic addition polymers are themselves well known and the procedures for making them are well known. These polymers comprise quaternary ammonium-containing mer units and ammonium-free mer units.

The quaternary ammonium-containing mer units are derived from ethylenically unsaturated monomers containing either quaternary ammonium groups or tertiary amino groups which can be quaternized by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing quaternary ammonium groups include:

trimethyl-2-(methacryloyloxy)ethylammonium salt,
triethyl-2-(methacryloyloxy)ethylammonium salt,
trimethyl-2-(acryloyloxy)ethylammonium salt,
triethyl-2-(acryloyloxy)ethylammonium salt,
trimethyl-3-(methacryloyloxy)propylammonium salt,
triethyl-3-(methacryloyloxy)propylammonium salt,
trimethyl-2-(methacryloylamino)ethylammonium salt,
triethyl-2-(methacryloylamino)ethylammonium salt,
trimethyl-2-(acryloylamino)ethylammonium salt,
triethyl-2-(acryloylamino)ethylammonium salt,
trimethyl-3-(methacryloylamino)propylammonium salt,
triethyl-3-(methacryloylamino)propylammonium salt,
trimethyl-3-(acryloylamino)propylammonium salt,
triethyl-3-(acryloylamino)propylammonium salt,
N,N-dimethyl-N-ethyl-2-(methacryloyloxy)ethylammonium salt,
N,N-diethyl-N-methyl-2-(methacryloyloxy)ethylammonium salt,
N,N-dimethyl-N-ethyl-3-(acryloylamino)propylammonium salt,
N,N,N-trimethyl-N-(p-vinylbenzyl)ammonium salt,
N,N,N-trimethyl-N-(m-vinylbenzyl)ammonium salt, N,N,N-triethyl-N-(p-vinylbenzyl)ammonium salt, N,N,N-triethyl-N-(m-vinylbenzyl)ammonium salt, N,N-dimethyl-N-ethyl-N-(p-vinylbenzyl)ammonium salt, and N,N-diethyl-N-methyl-N-(p-vinylbenzyl)ammonium salt.

Examples of ethylenically unsaturated monomer which contains at least one tertiary amino group that can be converted to a quaternary ammonium group after polymerization include:

dimethylaminoethyl methacrylate, diethylaminoethyl methacrylate, dimethylaminoethyl acrylate, diethylaminoethyl acrylate, dimethylaminopropyl methacrylate, diethylaminopropyl methacrylate, N-(dimethylaminoethyl)methacrylamide N-(diethylaminoethyl)methacrylamide N-(dimethylaminoethyl)acrylamide N-(diethylaminoethyl)acrylamide N-(dimethylaminopropyl)methacrylamide N-(diethylaminopropyl)methacrylamide N-(dimethylaminopropyl)acrylamide N-(diethylaminopropyl)acrylamide N-ethyl-N-methylaminoethyl methacrylate, N-ethyl-N-methylaminopropyl acrylate, N,N-dimethyl-N-(p-vinylbenzyl)amine, N,N-dimethyl-N-(m-vinylbenzyl)amine, N,N-diethyl-N-(p-vinylbenzyl)amine, N,N-diethyl-N-(m-vinylbenzyl)amine, and N-ethyl-N-methyl-N-(p-vinylbenzyl)amine.

Water-soluble second cationic addition polymers are themselves well known and the procedures for making them are well known. These polymers comprise secondary, tertiary or both secondary and tertiary ammonium-containing mer units and ammonium-free mer units.

The secondary ammonium-containing mer units are derived from ethylenically unsaturated monomers containing either secondary ammonium groups or secondary amino groups which can be converted to secondary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing secondary ammonium groups include:

methyl-2-(methacryloyloxy)ethylammonium salt, ethyl-2-(methacryloyloxy)ethylammonium salt, n-propyl-2-(methacryloyloxy)ethylammonium salt, isopropyl-2-(methacryloyloxy)ethylammonium salt, n-butyl-2-(methacryloyloxy)ethylammonium salt, sec-butyl-2-(methacryloyloxy)ethylammonium salt, isobutyl-2-(methacryloyloxy)ethylammonium salt, tert-butyl-2-(methacryloyloxy)ethylammonium salt, methyl-2-(acryloyloxy)ethylammonium salt, ethyl-2-(acryloyloxy)ethylammonium salt, n-propyl-2-(acryloyloxy)ethylammonium salt, isopropyl-2-(acryloyloxy)ethylammonium salt, n-butyl-2-(acryloyloxy)ethylammonium salt, sec-butyl-2-(acryloyloxy)ethylammonium salt, isobutyl-2-(acryloyloxy)ethylammonium salt, tert-butyl-2-(acryloyloxy)ethylammonium salt, methyl-3-(methacryloyloxy)propylammonium salt, ethyl-3-(methacryloyloxy)propylammonium salt, n-propyl-3-(methacryloyloxy)propylammonium salt, methyl-3-(acryloyloxy)propylammonium salt, ethyl-3-(acryloyloxy)propylammonium salt, n-propyl-3-(acryloyloxy)propylammonium salt, methyl-2-(acryloylamino)ethylammonium salt, ethyl-2-(methacryloylamino)ethylammonium salt, n-propyl-2-(methacryloylamino)ethylammonium salt, isopropyl-2-(methacryloylamino)ethylammonium salt, n-butyl-2-(methacryloylamino)ethylammonium salt, sec-butyl-2-(methacryloylamino)ethylammonium salt, isobutyl-2-(methacryloylamino)ethylammonium salt, tert-butyl-2-(methacryloylamino)ethylammonium salt, methyl-2-(acryloylamino)ethylammonium salt, ethyl-2-(acryloylamino)ethylammonium salt, n-propyl-2-(acryloylamino)ethylammonium salt, isopropyl-2-(acryloylamino)ethylammonium salt, n-butyl-2-(acryloylamino)ethylammonium salt, sec-butyl-2-(acryloylamino)ethylammonium salt, isobutyl-2-(acryloylamino)ethylammonium salt, tert-butyl-2-(acryloylamino)ethylammonium salt, methyl-3-(methacryloylamino)propylammonium salt, ethyl-3-(methacryloylamino)propylammonium salt, n-propyl-3-(methacryloylamino)propylammonium salt, methyl-3-(acryloylamino)propylammonium salt, ethyl-3-(acryloylamino)propylammonium salt, n-propyl-3-(acryloylamino)propylammonium salt, methyl-p-vinylbenzylammonium salt, methyl-m-vinylbenzylammonium salt, ethyl-p-vinylbenzylammonium salt, and ethyl-m-vinylbenzylammonium salt.

Examples of ethylenically unsaturated monomer which contain s at least one secondary amino group that can be converted to a secondary ammonium group after polymerization include:

methylaminoethyl methacrylate, ethylaminoethyl methacrylate, n-propylaminoethyl methacrylate, isopropylaminoethyl methacrylate, n-butylaminoethyl methacrylate, sec-butylaminoethyl methacrylate, isobutylaminoethyl methacrylate, tert-butylaminoethyl methacrylate, methylaminoethyl acrylate, ethylaminoethyl acrylate, n-propylaminoethyl acrylate, isopropylaminoethyl acrylate, n-butylaminoethyl acrylate, sec-butylaminoethyl acrylate, isobutylaminoethyl acrylate, tert-butylaminoethyl acrylate, methylaminopropyl methacrylate,
ethylaminopropyl methacrylate,
n-propylaminopropyl methacrylate,
isopropylaminopropyl methacrylate,
n-butylaminopropyl methacrylate,
sec-butylaminopropyl methacrylate,
isobutylaminopropyl methacrylate,
tert-butylaminopropyl methacrylate,
methyl aminopropyl acrylate,
ethyl aminopropyl acrylate,
n-propylaminpropyl acrylate,
isopropylaminopropyl acrylate,
n-butylaminopropyl acrylate,
sec-butylaminopropyl acrylate,
isobutylaminopropyl acrylate,
tert-butylaminopropyl acrylate,
N-(methylaminoethyl)methacrylamide
N-(ethylaminoethyl)methacrylamide
N-(methylaminoethyl)acrylamide
N-(ethylaminoethyl)acrylamide
N-(methylaminopropyl)methacrylamide
N-(ethylaminopropyl)methacrylamide
N-(methylaminopropyl)acrylamide
N-(ethylaminopropyl)acrylamide
N-methyl-N-(methylaminoethyl)methacrylamide
N-methyl-N-(methylaminoethyl)acrylamide
N-methyl-N-(p-vinylbenzyl)amine,
N-methyl-N-(m-vinylbenzyl)amine,
N-ethyl-N-(p-vinylbenzyl)amine,
N-ethyl-N-(m-vinylbenzyl)amine.

The tertiary ammonium-containing mer units are derived from ethylenically unsaturated monomers containing either tertiary ammonium groups or tertiary amino groups which can be converted to tertiary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing tertiary ammonium groups include: dimethyl-2-(methacryloyloxy)ethylammonium salt, diethyl-2-(methacryloyloxy)ethylammonium salt,
dimethyl-2-(acryloyloxy)ethylammonium salt,
diethyl-2-(acryloyloxy)ethylammonium salt,
dimethyl-3-(methacryloyloxy)propylammonium salt,
diethyl-3-(methacryloyloxy)propylammonium salt,
dimethyl-2-(methacryloylamino)ethylammonium salt,
diethyl-2-(methacryloylamino)ethylammonium salt,
dimethyl-2-(acryloylamino)ethylammonium salt,
diethyl-2-(acryloylamino)ethylammonium salt,
dimethyl-3-(methacryloylamino)propylammonium salt,
diethyl-3-(methacryloylamino)propylammonium salt,
dimethyl-3-(acryloylamino)propylammonium salt,
diethyl-3-(acryloylamino)propylammonium salt,
N-methyl-N-ethyl-2-(methacryloyloxy)ethylammonium salt,
N-ethyl-N-methyl-2-(methacryloyloxy)ethylammonium salt,
N-methyl-N-ethyl-3-(acryloylamino)propylammonium salt,
dimethyl-p-vinylbenzylammonium salt,
dimethyl-m-vinylbenzylammonium salt,
diethyl-p-vinylbenzylammonium salt,
diethyl-m-vinylbenzylammonium salt,
N-methyl-N-ethyl-p-vinylbenzylammonium salt,
N-methyl-N-ethyl-p-vinylbenzylammonium salt, Examples of ethylenically unsaturated monomer which contains at least one tertiary amino group that can be converted to a tertiary ammonium group after polymerization include:

dimethylaminoethyl methacrylate,
diethylaminoethyl methacrylate,
dimethylaminoethyl acrylate,
diethylaminoethyl acrylate,
dimethylaminopropyl methacrylate,
diethylaminopropyl methacrylate,
N-(dimethylaminoethyl)methacrylamide
N-(diethylaminoethyl)methacrylamide
N-(dimethylaminoethyl)acrylamide
N-(diethylaminoethyl)acrylamide
N-(dimethylaminopropyl)methacrylamide
N-(diethylaminopropyl)methacrylamide
N-(dimethylaminopropyl)acrylamide
N-(diethylaminopropyl)acrylamide
N-ethyl-N-methylaminoethyl methacrylate,
N-ethyl-N-methylaminopropyl acrylate,
N,N-dimethyl-N-(p-vinylbenzyl)amine,
N,N-dimethyl-N-(m-vinylbenzyl)amine,
N,N-diethyl-N-(p-vinylbenzyl)amine,
N,N-diethyl-N-(m-vinylbenzyl)amine, and
N-ethyl-N-methyl-N-(p-vinylbenzyl)amine.

The ammonium-free mer units are derived from ethylenically unsaturated monomers containing groups which are devoid of ammonium groups. Usually, but not necessarily, these monomers contain acrylyl functionality, methacrylyl functionality, or vinyl functionality, although others such as allyl functionality or methallyl functionality may be used. Examples of ethylenically unsaturated monomers which are devoid of ammonium groups include: methyl methacrylate, ethyl methacrylate, n-propyl methacrylate, isopropyl methacrylate, n-butyl methacrylate, sec-butyl methacrylate, isobutyl methacrylate, tert-butyl methacrylate, methyl acrylate, ethyl acrylate, n-propyl acrylate, isopropyl acrylate, n-butyl acrylate, sec-butyl acrylate, isobutyl acrylate, tert-butyl acrylate, N-methyl methacrylamide, N-ethyl methacrylamide, N-n-propyl methacrylamide, N-isopropyl methacrylamide, N-n-butyl methacrylamide, N-sec-butyl methacrylamide, N-isobutyl methacrylamide, N-tert-butyl methacrylamide, N-methyl acrylamide, N-ethyl acrylamide, N-n-propyl acrylamide, N-isopropyl acrylamide, N-n-butyl acrylamide, N-sec-butyl acrylamide, N-isobutyl acrylamide, N-tert-butyl acrylamide, N,N-dimethyl methacrylamide, N,N-dimethyl methacrylamide, styrene, $\alpha$-methylstyrene, phenyl methacrylate, phenyl acrylate, o-tolyl methacrylate, m-tolyl methacrylate, p-tolyl methacrylate, o-tolyl acrylate, m-tolyl acrylate, p-tolyl acrylate, benzyl methacrylate, and benzyl acrylate. Of these, alkyl acrylate wherein the alkyl group contains from 1 to 4 carbon atoms, alkyl methacrylate wherein the alkyl group contains from 1 to 4 carbon atoms, and styrene are preferred.

Frequently at least 10 weight percent of the ammonium-free mer units of the second cationic addition polymer are derived from hydrophobic addition monomer. Often at least 20 weight percent of the ammonium-free mer units of the second cationic addition polymer are derived from hydrophobic addition monomer. In many cases at least 40 weight percent of the ammonium-free mer units of the second cationic addition polymer are derived from hydrophobic addition monomer. In other instances at least 60 weight percent of the ammonium-free mer units of the second cationic addition polymer are derived from hydrophobic addition monomer. Often at least 80 weight percent of the ammonium-free mer units of the second cationic addition polymer are derived from hydrophobic addition monomer. In some instances at least 95 weight percent of the ammonium-free mer units of the second cationic addition polymer are derived from hydrophobic addition monomer. In some instances all of the ammonium-free mer units of the second cationic addition polymer are derived from hydrophobic addition monomer.

As used herein and in the claims, the phrase "hydrophobic addition monomer" means addition monomer, the homopolymer of which (weight average molecular weight at least 1000) is water insoluble. In most cases the hydrophobic addition monomer contains no hydrophilic groups such as hydroxyl, carboxyl, primary amino, secondary amino, tertiary amino, or the like. The examples of ethylenically unsaturated monomers which are devoid of ammonium groups given above are all hydrophobic addition monomers. Usually at least 5 percent by weight of the hydrophobic addition monomers employed contain at least one aromatic hydrocarbon group. Preferably at least 10 percent by weight of the hydrophobic addition monomers employed contain at least one aromatic hydrocarbon group. Styrene is the preferred aromatic-containing addition monomer.

Formation of the addition polymers from ethylenically unsaturated monomers is usually accomplished by conventional free-radical polymerization methods. The polymerization may be a solution polymerization in the presence of solvent, or it may be a dispersion polymerization.

The quaternary ammonium-containing mer units are present in an amount sufficient to render the first cationic addition polymer water-soluble. The quaternary ammonium-containing mer units generally constitute from 10 to 95 weight percent of the first cationic addition polymer. Often the quaternary ammonium-containing mer units constitute from 10 to 85 weight percent of the first cationic addition polymer. From 20 to 80 weight percent is preferred.

Ammonium-free mer units generally constitute from 5 to 90 weight percent of the first cationic addition polymer. Often the ammonium-free mer units constitute from 15 to 90 weight percent of the first cationic addition polymer. From 20 to 80 weight percent is preferred.

The secondary, tertiary, or both secondary and tertiary ammonium-containing mer units are present in an amount sufficient to render the second cationic addition polymer water-soluble. The secondary, tertiary, or both secondary and tertiary ammonium-containing mer units generally constitute from 10 to 75 weight percent of the second cationic addition polymer. Often the secondary, tertiary, or both secondary and tertiary ammonium-containing mer units constitute from 15 to 65 weight percent of the second cationic addition polymer. From 20 to 55 weight percent is preferred.

Ammonium-free mer units generally constitute from 25 to 90 weight percent of the second cationic addition polymer. Often the ammonium-free mer units constitute from 35 to 85 weight percent of the second cationic addition polymer. From 45 to 80 weight percent is preferred.

As a component of the binder of the coating or coating composition as the case may be, the amount of organic polymer which is substantially free of ammonium groups, may vary considerably. Usually the organic polymer which is substantially free of ammonium groups constitutes from 10 to 90 percent by weight of the binder. Often the organic polymer which is substantially free of ammonium groups constitutes from 20 to 80 percent by weight of the binder. From 20 to 60 percent by weight of the binder is preferred.

As a component of the binder of the coating or coating composition as the case may be, the amount of first cationic addition polymer may vary considerably. Usually the first cationic addition polymer constitutes from 5 to 85 percent by weight of the binder. Often the first cationic addition polymer constitutes from 5 to 70 percent by weight of the binder. From 5 to 50 percent by weight of the binder is preferred.

As a component of the binder of the coating or coating composition as the case may be, the amount of second cationic addition polymer may vary considerably. Usually the second cationic addition polymer constitutes from 5 to 85 percent by weight of the binder. Often the second cationic addition polymer constitutes from 5 to 70 percent by weight of the binder. From 5 to 50 percent by weight of the binder is preferred.

The binder constitutes from 20 to 90 percent by weight of the solids of the coating composition. In many cases the binder constitutes from 25 to 80 percent by weight of the solids of the coating composition. From 35 to 80 percent by weight is preferred.

Similarly, the binder constitutes from 20 to 90 percent by weight of the dry coating. Often the binder constitutes from 25 to 80 percent by weight of the dry coating. From 35 to 80 percent by weight is preferred.

Polymer constituting some or all of the binder of the coating may or may not be insolubilized after application of the coating composition to the substrate. As used herein and in the claims, insolubilized organic polymer is organic polymer which is water-soluble or water-dispersed when applied to the substrate and which is completely or partially insolubilized after such application. Insolubilization may be accomplished through use of insolubilizer. Insolubilizers generally function as crosslinking agents. Preferably the insolubilizer reacts with functional groups of at least a portion of the organic polymer to provide the desired degree of insolubilization to the total organic polymer of the coating.

There are many available insolubilizers which may optionally be used. Examples of suitable insolubilizers include, but are not limited to, Curesan® 199 insolubilizer (PPG Industries, Inc., Pittsburgh, Pa.), Curesan® 200 insolubilizer (PPG Industries, Inc.), Sequarez® 700C insolubilizer (Sequa Chemicals, Inc., Chester, SC), Sequarez® 700M insolubilizer (Sequa Chemicals, Inc.), Sequarez® 755 insolubilizer (Sequa Chemicals, Inc.), Sequarez® 770 insolubilizer (Sequa Chemicals, Inc.), Berset® 39 insolubilizer (Bercen Inc., Cranston, R.I.), Berset® 47 insolubilizer (Bercen Inc.), Berset® 2185 insolubilizer (Bercen Inc.), and Berset® 2586 insolubilizer (Bercen Inc.).

When used, the amount of insolubilizer present in the binder of the coating composition may vary considerably. In such instances the weight ratio of the insolubilizer to the polymer of the binder is usually in the range of from 0.05:100 to 15:100. Often the weight ratio is in the range of from 1:100 to 10:100. From 2:100 to 5:100 is preferred. These ratios are on the basis of insolubilizer dry solids and polymer dry solids.

The finely divided substantially water-insoluble filler particles may be finely divided substantially water-insoluble inorganic filler particles, finely divided substantially water-insoluble thermoset organic particles, or finely divided substantially water-insoluble nonfilm-forming thermoplastic organic polymer particles.

The finely divided substantially water-insoluble inorganic filler particles which may be present are often finely divided substantially water-insoluble particles of metal oxide. The metal oxide constituting the particles may be a simple metal oxide (i.e., the oxide of a single metal) or it may be a complex metal oxide (i.e., the oxide of two or more metals). The particles of metal oxide may be particles of a single metal oxide or they may be a mixture of different particles of different metal oxides.

Examples of suitable metal oxides include alumina, silica, and titania. Other oxides may optionally be present in minor amount. Examples of such optional oxides include, but are not limited to, zirconia, hafnia, and yttria. Other metal oxides that may optionally be present are those which are ordinarily present as impurities such as for example, iron oxide. For purposes of the present specification and claims, silicon is considered to be a metal.

When the particles are particles of alumina, most often the alumina is alumina monohydroxide. Particles of alumina monohydroxide, AlO(OH), and their preparation are known. The preparation and properties of alumina monohydroxide are described by B. E. Yoldas in *The American Ceramic Society Bulletin*, Vol. 54, No. 3, (March 1975), pages 289–290, in *Journal of Applied Chemical Biotechnology*, Vol. 23 (1973), pages 803–809, and in *Journal of Materials Science*, Vol. 10 (1975), pages 1856–1860. Briefly, aluminum isopropoxide or aluminum secondary-butoxide are hydrolyzed in an excess of water with vigorous agitation at from 75 C to 80° C. to form a slurry of aluminum monohydroxide. The aluminum monohydroxide is then peptized at temperatures of at least 80° C. with an acid to form a clear alumina monohydroxide sol which exhibits the Tyndall effect when illuminated with a narrow beam of light. Since the alumina monohydroxide of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. Although it is desired not to be bound by any theory, it is believed that the alumina monohydroxide produced in this manner is pseudoboehmite. Pseudoboehmite is indeed the preferred alumina monohydroxide for use in the present invention. The alumina monohydroxide is not a pigment and does not function as a pigment in the present invention; In most instances the alumina monohydroxide is transparent and colorless.

Colloidal silica is also known. Its preparation and properties are described by R. K. Iler in *The Chemistry of Silica*, John Wiley & Sons, Inc., New York (1979) ISBN 0-471-02404-X, pages 312–337, and in U.S. Pat. Nos. 2,601,235; 2,614,993; 2,614,994; 2,617,995; 2,631,134; 2,885,366; and 2,951,044, the disclosures of which are, in their entireties, incorporated herein by reference. Examples of commercially available colloidal silica include Ludox® HS, LS, SM, TM and CL-X colloidal silica (E. I. du Pont de Nemours & Company, Inc.) in which the counter ion is the sodium ion, and Ludox® AS colloidal silica (E. I. du Pont de Nemours & Company, Inc.) in which the counter ion is the ammonium ion. Another example is Ludox® AM colloidal silica (E. I. du Pont de Nemours & Company, Inc.) in which some of the silicon atoms have been replaced by aluminum atoms and the counter ion is the sodium ion.

Colloidal titania is also known. Its preparation and properties are described in U.S. Pat. No. 4,275,118. Colloidal titania may also be prepared by reacting titanium isopropoxide [CAS 546-68-9] with water and tetramethyl ammonium hydroxide.

Finely divided substantially water-insoluble thermoset organic filler particles which may be present are particles of organic polymer crosslinked at least to the extent that they cannot be significantly softened or remelted by heat. Examples of such thermoset organic polymer particles include particles of thermoset melamine-aldehyde polymer, thermoset resorcinol-aldehyde polymer, thermoset phenol-resorcinol-aldehyde polymer, thermoset (meth)acrylate polymer, or thermoset styrene-divinylbenzene polymer.

The finely divided substantially water-insoluble nonfilm-forming thermoplastic organic filler particles which may be present are thermoplastic in that they may be softened and/or melted at elevated temperatures. Nevertheless they are nonfilm-forming when used in accordance with this invention. Examples of suitable finely divided substantially water-insoluble nonfilm-forming thermoplastic organic polymer particles include polyethylene particles such as those contained in Poly Emulsion 316N30 sol (ChemCor Inc., Chester, N.Y.), maleated polypropylene particles such as those contained in Poly Emulsion 43C30 sol (ChemCor Inc., Chester, N.Y.), and polyacrylate, polymethacrylate, polystyrene, and/or fluoropolymer particles made by microemulsion processes.

The filler particles have a maximum dimension of less than 500 nanometers. Often the filler particles have a maximum dimension of less than 100 nanometers. Frequently the maximum dimension is less than 50 nanometers. Preferably the maximum dimension is less than 20 nanometers.

As used herein and in the claims the maximum dimension of the filler particles is determined by transmission electron microscopy.

The amount of the finely divided substantially water-insoluble filler particles in the coating or in the solids of the coating composition, as the case may be, is critical for the same reasons given above in respect of the amount of film-forming organic polymer present in the solids of the coating composition and the amount of organic polymer of the binder present in the coating.

The finely divided substantially water-insoluble filler particles constitute from 10 to 80 percent by weight of the coating or of the solids of the coating composition. In many cases the finely divided substantially water-insoluble filler particles constitute from 15 to 75 percent by weight of the coating or of the solids of the coating composition. From 15 to 65 percent by weight is preferred. As used herein and in the claims, "solids of the coating composition" is the residue remaining after the solvent and any other volatile materials have been substantially removed from the coating composition by drying to form a coating in accordance with good coatings practice.

The finely divided substantially water-insoluble filler particles having a maximum dimension of less than 500 nanometers and the binder together usually constitute from 2 to 35 percent by weight of the coating composition. Frequently such particles and the binder together constitute from 2 to 30 percent by weight of the coating composition. Often such particles and the binder together constitute from 4 to 25 percent by weight of the coating composition. Preferably such particles and the binder together constitute from 5 to 20 percent by weight of the coating composition.

Among the materials which may optionally be present in the coating composition is surfactant. For purposes of the present specification and claims surfactant is considered not to be a part of the binder. There are many available surfactants and combinations of surfactants which may be used. Examples of suitable surfactants include, but are not limited to, Fluorad® FC-170-C surfactant (3M Company), and Triton® X-405 surfactant (Union Carbide Corporation).

When used, the amount of surfactant present in the coating composition may vary considerably. In such instances the weight ratio of the surfactant to the binder is usually in the range of from 0.01:100 to 10:100. In many instances the weight ratio is in the range of from 0.1:100 to 10:100. Often the weight ratio is in the range of from 0.2:100 to 5:100. From 0.5:100 to 2:100 is preferred. These ratios are on the basis of surfactant dry solids and binder dry solids.

There are many other conventional adjuvant materials which may optionally be present in the coating composition. These include such materials as lubricants, waxes, plasticizers, antioxidants, organic solvents, lakes, and pigments. The listing of such materials is by no means exhaustive. These and other ingredients may be employed in their customary amounts for their customary purposes so long as they do not seriously interfere with good coating composition formulating practice.

The pH of the coating composition may vary considerably. In most instances the pH is in the range of from 3 to 10. Often the pH is in the range of from 3.5 to 7. In other instances the pH is in the range of from 7 to 9.

The coating compositions are usually prepared by simply admixing the various ingredients. The ingredients may be mixed in any order. Although the mixing of liquid and solids is usually accomplished at room temperature, elevated temperatures are sometimes used. The maximum temperature which is usable depends upon the heat stability of the ingredients.

The coating compositions are generally applied to the surface of the substrate using any conventional technique known to the art. These include spraying, curtain coating, dipping, rod coating, blade coating, roller application, size press, printing, brushing, drawing, slot-die coating, and extrusion. The coating is then formed by removing the solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the substrate, the solvent is substantially removed, usually by drying.

The substrate may be any substrate at least one surface of which is capable of bearing the coating discussed above. In most instances the substrate is in the form of an individual sheet or in the form of a roll, web, strip, film, or foil of material capable of being cut into sheets.

The substrate may be porous throughout, it may be nonporous throughout, or it may comprise both porous regions and nonporous regions.

Examples of porous substrates include paper, paperboard, wood, cloth, nonwoven fabric, felt, unglazed ceramic material, microporous polymer membranes, microporous membranes comprising both polymer and filler particles, porous foam, and microporous foam.

Examples of substrates which are substantially nonporous throughout include sheets or films of organic polymer such as poly(ethylene terephthalate), polyethylene, polypropylene, cellulose acetate, poly(vinyl chloride), and copolymers such as saran. The sheets or films may be filled or unfilled. The sheets or films may be metallized or unmetallized as desired. Additional examples include metal substrates including but not limited to metal foils such as aluminum foil and copper foil. Yet another example is a porous or microporous foam comprising thermoplastic organic polymer which foam has been compressed to such an extent that the resulting deformed material is substantially nonporous. Still another example is glass.

Base stocks which are normally porous such as for example paper, paperboard, wood, cloth, nonwoven fabric, felt, unglazed ceramic material, microporous polymer membranes, microporous membranes comprising both polymer and filler particles, porous foam, or microporous foam may be coated or laminated to render one or more surfaces substantially nonporous and thereby provide substrates having at least one substantially nonporous surface.

The substrate may be substantially transparent, it may be substantially opaque, or it may be of intermediate transparency. For some applications such as inkjet printed overhead slides, the substrate must be sufficiently transparent to be useful for that application. For other applications such as inkjet printed paper, transparency of the substrate is not so important.

The thickness of the coating may vary widely, but in most instances the thickness of the coating is in the range of from 1 to 40 μm. In many cases the thickness of the coating is in the range of from 5 to 40 μm. Often the thickness is in the range of from 8 to 30 μm. From 12 to 18 μm is preferred.

The coating may be substantially transparent, substantially opaque, or of intermediate transparency. It may be substantially colorless, it may be highly colored, or it may be of an intermediate degree of color. Usually the coating is substantially transparent and substantially colorless. As used herein and in the claims, a coating is substantially transparent if its luminous transmission in the visible region is at least 80 percent of the incident light. Often the luminous transmission of the coating is at least 85 percent of the incident light. Preferably the luminous transmission of the coating is at least 90 percent. Also as used herein and in the claims, a coating is substantially colorless if the luminous transmission is substantially the same for all wavelengths in the visible region, viz., 400 to 800 nanometers.

Optionally the above-described coatings may be overlaid with an overcoating comprising ink-receptive organic film-forming polymer. The overcoating may be formed by applying an overcoating composition comprising a liquid medium and ink-receptive organic film-forming polymer dissolved or dispersed in the liquid medium and removing the liquid medium, as for example, by drying. Preferably the liquid medium is an aqueous solvent and the ink-receptive organic film-forming polymer is water-soluble poly(ethylene oxide) having a weight average molecular weight in the range of from 100,000 to 3,000,000, both of which have been described above in respect of earlier described embodiments of the invention. Water is an especially preferred aqueous solvent.

The relative proportions of liquid medium and organic film-forming polymer present in the overcoating composition may vary widely. The minimum proportion is that which will produce an overcoating composition having a viscosity low enough to apply as an overcoating. The maximum proportion is not governed by any theory, but by practical considerations such as the cost of the liquid medium and the cost and time required to remove the liquid medium from the applied wet overcoating. Usually, however, the weight ratio of liquid medium to film-forming organic polymer is from 18:1 to 50:1. Often the weight ratio is from 19:1 to 40:1. Preferably weight ratio is from 19:1 to 24:1.

Optional ingredients such as those discussed above may be present in the overcoating composition when desired.

The overcoating composition may be prepared by admixing the ingredients. It may be applied and dried using any of the coating and drying techniques discussed above. When an overcoating composition is to be applied, it may be applied once or a multiplicity of times.

Other than in the operating examples, or where otherwise indicated, all numbers expressing quantities of ingredients or reaction conditions used herein are to be understood as modified in all instances by the term "about".

The invention is further described in conjunction with the following examples which are to be considered illustrative rather than limiting, and in which all parts are parts by weight and all percentages are percentages by weight unless otherwise specified.

EXAMPLE

With stirring 22.35 kg. of aluminum tri-secondary butoxide [CAS 2269-22-9] was charged with stirring into a reactor containing 75 kg of water at about 78° C. Four hundred twenty grams of 70% nitric acid was diluted in 1110 grams of water and added into the same reactor immediately after the charging of aluminum tri-secondary butoxide. The system was closed when the reactor was heated to about 120° C. gaining pressure to about 276 kilopascals, gauge. The reactor was held at this temperature for 5 hours then cooled to 70° C. and opened. Then the reactor was heated to boil off the alcohol and water-alcohol azeotrope of the hydrolysis reaction until the concentration of the alumina monohydroxide sol reached about 10 weight percent AlO(OH), about 54 kg. total, having a pH of 3.8–4.0 and a turbidity of 112.

The following initial charge and feeds shown in Table 1 were used in the preparation of aqueous secondary amine functional acrylic polymer via solution polymerization technique.

TABLE 1

| Ingredients | Weight, grams |
|---|---|
| *Initial Charge* | |
| Isopropanol | 130.0 |
| *Feed 1* | |
| Isopropanol | 113.0 |
| n-Butyl acrylate | 69.2 |
| Methyl methacrylate | 153.0 |
| 2-(tert-Butylamino)ethyl methacrylate [CAS 3775-90-4] | 73.0 |
| Styrene | 69.2 |
| VAZO ® 67 Initiator[1] | 18.2 |
| *Feed 2* | |
| Glacial acetic acid | 17.7 |
| *Feed 3* | |
| Deionized water | 1085. 0 |

[1]2,2'-Azobis(2-methylbutanenitrile) initiator commercially available from E. I. du Pont de Nemours and Company, Wilmington, Delaware.

The initial charge was heated in a reactor with agitation to ref lux temperature (80° C.). Then Feed 1 was added in a continuous manner over a period of 3 hours. At the completion of Feed 1 addition, the reaction mixture was held at reflux for 3 hours. The resultant acrylic polymer solution had a total solids content of 61.7 percent (determined by weight difference of a sample before and after heating at 110° C. for one hour) and number average molecular weight of 4792 as determined by gel permeation chromatography using polystyrene as the standard. Thereafter, Feed 2 was added over five minutes at room temperature with agitation. After the completion of the addition of Feed 2, Feed 3 was added over 30 minutes while the reaction mixture was heated for azeotropic distillation of isopropanol. When the distillation temperature reached 99° C., the distillation was continued about one more hour and then the reaction mixture was cooled to room temperature. The total distillate collected was 550.6 grams. The product, which was a tertiary amine salt cationic acrylic polymer aqueous solution, had a solids content of 32.6 percent by weight (determined by weight difference of a sample before and after heating at 110° C. for one hour), and a pH of 5.25.

The following initial charge and feeds shown in Table 2 were used in the preparation of a quaternary ammonium addition polymer.

TABLE 2

| Ingredients | Weight, grams |
|---|---|
| *Initial Charge* | |
| Isopropanol | 100.0 |
| *Feed 1* | |
| Isopropanol | 106.5 |
| VAZO ® 67 Initiator[1] | 18.2 |
| *Feed 2* | |
| Isopropanol | 205.7 |
| Styrene | 182.5 |
| 75% aqueous solution of trimethyl-2-(methacrylyloyloxy)-ethylammonium chloride | 243.3 |
| *Feed 3* | |
| Deionized water | 787.0 |

[1]2,2'-Azobis(2-methylbutanenitrile) initiator commercially available from E. I. du Pont de Nemours and Company, Wilmington, Delaware.

The Initial Charge was charged to a reactor and heated with agitation to reflux temperature (77–80° C.). At reflux Feed 1 was added continuously over a period of three hours. Fifteen minutes after beginning addition of Feed 1, the addition of Feed 2 was begun. Feed 2 was added continuously over a period of three hours. After completion of both additions, the reaction mixture was held at reflux for 4 hours. Upon completion of the holding period, the reactor was set for total distillation. About 297 grams of Feed 3 was added to the reactor, the jacket temperature was reduced, and vacuum was applied slowly. Vacuum distillation was begun and 491 grams of distillate was collected. The remaining Feed 3 was charged and distillation under vacuum was continued. After most distillate was removed, the percent solids was ascertained and the solution was adjusted to 31.8 weight percent solids and filtered through a 5-micrometer glass fiber filter. The product was a quaternary ammonium addition polymer solution.

A polymer composition was prepared by admixing 174.3 grams of a 6 percent by weight poly(ethylene oxide) aqueous solution, 39.48 grams of a tertiary amine salt cationic acrylic polymer aqueous solution prepared similarly to that described above, 39.48 grams of the quaternary ammonium addition polymer aqueous solution described above. An intermediate composition was formed by admixing 81.7 grams of a pseudoboehmite sol containing 12.9 percent solids by weight which was prepared similarly to that described above. A coating composition was prepared by admixing 90 milligrams of Fluorad® FC-170-C surfactant (3M Company) and 60 milligrams of Macol® OP-40 surfactant (PPG Industries, Inc.).

The coating composition was applied to poly(ethylene terphthalate) substrates with a Meyer rod #120 and allowed to dry in an air-blown oven at 105° C. for 4.5 minutes. The dry coating was about 15 micrometers thick and it was very clear. The coated substrates were then printed on the coated side with a Hewlett-Packard 870 Inkjet Printer or a Hewlett-Packard 1600c Inkjet Printer. The printed sheets were placed in a humidity chamber (35° C. and 80% relative humidity) for several days to ascertain bleed of printed image. The image maintained its acuity under those conditions.

Although the present invention has been described with reference to specific details of certain embodiments thereof, it is not intended that such details should be regarded as limitations upon the scope of the invention except insofar as they are included in the accompanying claims.

What is claimed is:

1. A coating composition comprising:

(a) a volatile aqueous liquid medium; and (b) binder dissolved or dispersed in the volatile aqueous liquid medium, the binder comprising:

(1) water-soluble film-forming organic polymer which is substantially free of ammonium groups, (2) water-soluble first cationic addition polymer consisting essentially of quaternary ammonium-containing mer units and ammonium-free mer units, and (3) water-soluble second cationic addition polymer consisting essentially of secondary, tertiary, or both secondary and tertiary ammonium-containing mer units and ammonium-free mer units, wherein the binder constitutes from 20 to 90 percent by weight of the solids of the coating composition; and (c) finely divided substantially water-insoluble filler particles which have a maximum dimension of less than 500 nanometers and constitute from 10 to 80 percent by weight of the solids of the coating composition.

2. The coating composition of claim 1 wherein the binder is dissolved in the volatile aqueous liquid medium.

3. The coating composition of claim 2 wherein the water-soluble film-forming organic polymer which is substantially free of ammonium groups is poly(ethylene oxide), poly (vinyl alcohol), poly(vinyl pyrrolidone), cellulosic organic polymer, or a mixture of two or more thereof.

4. The coating composition of claim 2 wherein:

(a) quaternary ammonium-containing mer units constitute from 10 to 95 weight percent of the water-soluble first cationic addition polymer, and (b) ammonium-free mer units constitute from 5 to 90 weight percent of the water-soluble first cationic addition polymer.

5. The coating composition of claim 2 wherein:

(a) secondary, tertiary, or both secondary and tertiary ammonium-containing mer units constitute from 10 to 75 weight percent of the water-soluble second cationic addition polymer, and (b) ammonium-free mer units constitute from 25 to 90 weight percent of the water-soluble second cationic addition polymer.

6. The coating composition of claim 2 wherein at least 10 weight percent of the ammonium-free mer units of the water-soluble second cationic addition polymer are derived from hydrophobic addition monomer.

7. The coating composition of claim 6 wherein at least 5 percent by weight of the hydrophobic addition monomer contains at least one aromatic hydrocarbon group.

8. The coating composition of claim 2 wherein:

(a) the water-soluble film-forming organic polymer which is substantially free of ammonium groups constitutes from 10 to 90 percent by weight of the binder, (b) the water-soluble first cationic addition polymer constitutes from 5 to 85 percent by weight of the binder, (c) the water-soluble second cationic addition polymer constitutes from 5 to 85 percent by weight of the binder.

9. The coating composition of claim 2 wherein the filler particles have a maximum dimension of less than 100 nanometers.

10. The coating composition of claim 2 wherein the filler particles have a maximum dimension of less than 50 nanometers.

11. The coating composition of claim 2 wherein the filler particles constitute from 15 to 65 percent by weight of the solids of the coating composition.

12. The coating composition of claim 2 wherein the filler particles and the binder together constitute from 2 to 35 percent by weight of the coating composition.

13. The coating composition of claim 2 wherein the filler particles and the binder together constitute from 5 to 20 percent by weight of the coating composition.

14. The coating composition of claim 2 wherein water constitutes at least 80 percent by weight of the volatile aqueous liquid medium.

15. The coating composition of claim 2 wherein the volatile aqueous liquid medium constitutes from 75 to 98 percent by weight of the coating composition.

* * * * *